United States Patent Office 2,879,268
Patented Mar. 24, 1959

2,879,268
METHODS OF IMPROVING THE DISSOLUTION OF HIGH-MOLECULAR SUBSTANCES

Elof Ingvar Jullander, Ornskoldsvik, Sweden, assignor to Mo Och Domsjo Aktiebolag, Ornskoldsvik, Sweden, a corporation of Sweden No Drawing. Application December 28, 1954
Serial No. 478,204

Claims priority, application Sweden February 12, 1954

14 Claims. (Cl. 260—232)

The present invention relates to high-molecular substances containing hydroxyl groups and soluble in water and/or aqueous alkali (aqueous solutions of sodium hydroxide, potassium hydroxide and the like), and is more particularly concerned with a method of increasing the rate of dissolution of such substances by a treatment which reduces or eliminates the tendency of such substances to form agglomerates when wetted by water or aqueous alkali respectively. The invention is particularly applicable to cellulose derivatives and especially cellulose ethers soluble in the above-mentioned solvents but is not limited thereto.

As a rule, high-molecular substances and more especially such high-molecular substances as have long-chain molecules tend to dissolve very slowly in solvents which are otherwise satisfactory solvents for such substances. In the present specification, only solvents consisting of water or dilute aqueous solutions of alkali are contemplated. When a particle of such a high-molecular substance contacts water it will initially swell to form a gel which becomes dissolved only slowly. The volume of the particle may often be increased several times in this manner before the dissolution process proper has commenced. If the particle is not too small, its surface layer will when it contacts the water, swell to a gelatinous film enclosing the particle. The rate at which the water can penetrate further into the central portions of the particle is then determined partly by the diffusion through the gel layer and partly by the progressive dissolution of the outer portions of the gel layer in the adjacent liquid portions. Diffusion processes require a rather long period of time, wherefore a manner of increasing the rate of dissolution is to increase the surface area to volume ratio of the particles as far as possible. This is generally achieved by comminution of the high-molecular matter to a smaller particle size. Here, however, another difficulty is encountered, namely the fact that such substances tend to agglomerate when they are wetted by the solvent. Under ideal conditions, such as e.g. vigorous agitation, this tendency of agglomeration may not cause too much trouble, but it is in practice often impossible to provide so effective distribution and agitating means that each particle will contact the liquid separately. Instead, lumps or aggregates are formed, in which the inner particles may for a surprisingly long period remain completely dry, protected against contact with the penetrating water by the gel layer formed around the lump.

A method which in special cases is available for facilitating the penetration by the solvent of larger particles and avoiding agglomeration of smaller particles is to conduct the dissolution process in two steps. In the first step such conditions are maintained that the particles can swell only to a limited extent. Three examples of this method may be mentioned.

When dissolving non-ionic cellulose ethers of the type which is soluble in cold but not in hot water (e.g. methyl cellulose, ethyl cellulose, methyl ethyl cellulose, methyl hydroxyethyl cellulose, ethyl hydroxyethyl cellulose) the particles are first treated with hot water which rapidly penetrates the particles. On subsequent cooling or addition of cold water, dissolution takes place rapidly.

On the contrary, when preparing solutions of starch and starch derivatives which do not dissolve in cold but in hot water it is suitable to impregnate the particles with cold water as a first step.

When dissolving products which are soluble only in alkaline solutions (such as e.g. low-substituted cellulose ethers of ionic or non-ionic type) the particles may be treated with water until thoroughly impregnated whereupon alkali is introduced.

While the methods above referred to usually operate satisfactorily, it is evident that they are applicable only to special groups of products and furthermore they may often be difficult or impossible to employ in practice. Hot water e.g. may not be available.

It has also been suggested to impregnate cellulose ethers with surface-active agents to facilitate penetration by the water into and between the particles. The present invention contemplates an entirely different and novel approach to the problem of accelerating the dissolution of high-molecular substances of the types above referred to.

It is the main object of this invention to provide a method of treating high-molecular hydroxyl-bearing substances soluble in water and/or in aqueous alkali so as to eliminate their tendency of agglomerating when they contact water or aqueous alkali.

It is another object to provide high-molecular hydroxyl-bearing substances soluble in water or aqueous alkali which are not subject to agglomeration when contacted with a solvent therefor, whereby dissolution of said substances in such solvent is facilitated.

It is also an object of this invention to achieve the above result without appreciably changing the chemical structure or physical form of the substance treated.

It is a further object of the invention to provide such substances in a form which may be dissolved more rapidly, without material changing the solubility of the substances.

It is known that by treatment of e.g. methyl cellulose with certain aldehydes, such as formaldehyde or dialdehydes, e.g. glyoxal, it is possible to obtain films which are insoluble in water. It is generally recognized that this is due to the fact that the aldehyde reacts with the hydroxyl groups of the cellulose ether, forming cross-linkages between the molecules whereby a three-dimensional molecular network is produced. A similar treatment is used to a certain extent in the textile industry, in which e. g. rayon is treated with formaldehyde or glyoxal under suitable conditions with respect to acidity and temperature. This results in a reduced swelling in water and an improved wet strength of the fiber.

It has now surprisingly been found that if particles of high-molecular, water- and/or alkali-soluble substances containing hydroxyl groups are treated with small amounts of formaldehyde or a dialdehyde, such as glyoxal, and this treatment is carried out under conditions such that—in accordance with the generally accepted view—only a slight amount of formation of cross-linkages takes place, agglomeration is entirely avoided when subsequently the substance is dissolved. In spite of this effect, the rate of dissolution of the individual particles need not be adversely affected by the treatment. On the contrary, an unessential lowering of the rate of dissolution of the outer layer of each particle may result in a more rapid penetration of the whole particle by the water, which has an advantageous effect on the dissolution of the whole particle. The net result will be a reduced period of dissolution and at the same time the requirements with respect to a uniform distribution and a good agitation may be considerably lowered. In short, the product will be more fool-proof in use.

The effect achieved can be demonstrated in a simple manner by filling a vessel half-full with water at room temperature and then cautiously sprinkling particles of the substance, e.g. water-soluble ethyl hydroxyethyl cellulose, on to the water surface. If any agitation is avoided, the lowermost particles will swell and will thereby stick together to a gel layer covering the water surface. This layer may in many cases prevent the water practically indefinitely from penetrating to the top layer of particles.

On the other hand, if the particles have been treated in accordance with the present invention, they will after a few seconds leave the water-surface and drop to the bottom of the vessel. In spite of the absence of any agitation no lumps of aggregated particles are formed.

It is to be understood the above explanation of the effect observed is not fully established. It is also possible that the treatment of this invention for reasons not fully understood changes the angle of contact at the interface between the particle and the water so that wetting of the particle is facilitated. It is to be understood, however, that the invention is not limited to any theoretical explanation of the effect of the treatment.

Examples of products which are suitable for treatment in accordance with this invention include cellulose derivatives which are soluble in water and/or in aqueous alkali. The group of cellulose esters having such properties includes e.g. cellulose sulfate. A great number of cellulose ethers having such properties are known and produced commercially. Ionic cellulose ethers are obtained by introducing into the cellulose molecule e.g. carboxymethyl, carboxyethyl or sulfoethyl groups; non-ionic cellulose ethers are obtained by introducing e.g. methyl, ethyl, hydroxyethyl, cyanoethyl groups. Other cellulose ethers which are prepared commercially contain two or more substituents and include e.g. methyl hydroxyethyl cellulose, ethyl hydroxyethyl cellulose, methyl ethyl cellulose, methyl carboxymethyl cellulose, hydroxyethyl carboxymethyl cellulose. As a general rule, a low degree of substitution affords solubility in aqueous alkali only, while a higher degree of substitution gives solubility in water as well as in aqueous alkali. The solubility is not only influenced by the degree of substitution, but also somewhat by the average degree of polymerization or average molecular weight of the cellulose derivative in that the solubility increases somewhat as the degree of polymerization decreases. As an example of the difference between the cellulose ethers soluble in aqueous alkali only and those soluble in water and aqueous alkali it may be mentioned that carboxymethyl cellulose having a degree of substitution (number of substituent groups per anhydroglucose unit of the cellulose molecules) of about 0.3 is usually soluble in aqueous alkali only, while a degree of substitution of 0.5 and higher gives solubility in water, too. Ethyl cellulose having a degree of substitution of about 0.6 to 0.8 dissolves only in aqueous alkali; when the degree of substitution has increased to about 1.2 to 1.3 the product dissolves moderately well in water. Analogous relations apply to methyl cellulose. With cellulose ethers containing methyl and ethyl groups, however, the solubility in water decreases when the degree of substitution is further increased above a certain optimum value. This is due to the fact that methyl and ethyl groups in themselves have a hydrophobic character.

Certain water-soluble cellulose ethers are soluble only in water of about room temperature or below, while they are insoluble in hot water. This is true of methyl and ethyl cellulose and of certain mixed ethers containing one or both of these groups. As examples of such hot-water-insoluble mixed ethers there may be mentioned ethyl hydroxyethyl cellulose containing 13% of ethylene oxide and 25% of ethoxyl, and methyl hydroxyethyl cellulose containing 4% of ethylene oxide and 21% of methoxyl.

Water and/or alkali-soluble cellulose derivatives such as those listed above and methods of preparing them are well-known in the art and no attempt will be made to describe such methods in detail since the invention is not concerned with the preparation of such substances but with a method of treating them to eliminate their tendency of agglomerating when contacted with water.

While the invention is primarily concerned with treatment of water and/or alkali-soluble cellulose derivatives and especially cellulose ethers which give excellent results when treated in accordance with this invention, similar advantages may be obtained by treating other high-molecular hydroxyl-bearing water-soluble substances in accordance with this invention. Thus, starches, modified starches and starch derivatives are well-suited for treatment according to the invention. Examples include swelled starch, dextrin, chlorinated starch, sulfonated starch, acetylated starch, methyl starch, hydroxy starch.

Closely related to the starches is the group of plant gums of various types, which are suited for treatment in accordance with this invention. Examples include alginates, pectin, carragheen, gum tragacanth, gum arabic, agar, Iceland moss, karaya gum, ghatti gum, locust bean gum, guar gum and others.

As an example of synthetic water-soluble, high-polymeric substances containing hydroxyl groups, polyvinyl alcohol may be mentioned.

As examples of aldehydes which are capable of being used in the process of this invention, formaldehyde and glyoxal have been mentioned; other aldehydes which may be employed are particularly the lower aliphatic dialdehydes, such as malonaldehyde (propanedial), succinaldehyde (butanedial), glutaraldehyde (pentanedial), adipaldehyde (hexanedial), heptanedial and octanedial. Formaldehyde and glyoxal, however, are the aldehydes preferably used, since they are most readily available. It will be noted that though formaldehyde is a monoaldehyde, its properties in certain respects differ considerably from those of the other monoaldehydes, and since in the present case formaldehyde reacts in a manner similar to that of glyoxal and other dialdehydes it is proper to group it together with the dialdehydes in this case.

In the treatment of this invention the product to be treated should be present in solid form, usually as fibres, granules or powder. The treatment can be carried out on the products irrespective of the size and shape of the particles.

The following examples in which parts and percentages are by weight unless otherwise stated serve to illustrate but not to limit the invention.

*Example 1*

20 grams of an ethyl hydroxyethyl cellulose having a degree of etherification of 0.7 with respect to ethoxyl groups and 0.9 with respect to ethylene oxide and having an average molecular weight corresponding to a viscosity in 2% aqueous solution at 20° C. of 1000 centipoises (measured with a Brookfield viscosimeter) was brought together with 30 milliliters of acetone in a flask. In a series of experiments, there were dissolved in the acetone various quantities of a 30% aqueous glyoxal to a content of 0.006, 0.015, 0.03, 0.15 and 0.3% (calculated as pure $(CHO)_2$) based on the solution corresponding to 0.009, 0.023, 0.045, 0.225 and 0.45% based on the cellulose ether. After half an hour the acetone-wetted ethyl hydroxyethyl cellulose was transferred to open bowls and was dried in an oven at 60° C. Tests to ascertain whether an appreciable effect has been obtained, were performed in the following manner. A beaker was filled half-full with water of 20° C. and on the water surface a few grams of the ethyl hydroxyethyl cellulose were distributed. The cellulose ether was in this experiment present in the form of granules having an average diameter of 0.5 to 1 millimeter. It was found that no granules of the untreated ethyl hydroxyethyl cellulose left the water surface to sink to the bottom due to the gelling effect when the granules initially contact the water. If the beaker was left to stand without agitation, more than one day passed before all granules were thoroughly wetted by water. The granules treated with acetone containing 0.3–0.15% of glyoxal left the water surface after a few seconds and dropped to the bottom of the beaker. In the other experiments of the series the effect diminished in intensity with decreasing concentration of glyoxal, but an appreciable effect was observable with as little as 0.006% glyoxal.

Example 2

A methyl hydroxyethyl cellulose containing 21% of methoxyl and 4% of ethylene oxide was treated in the same manner as described in Example 1 with an acetone solution containing 0.15% of glyoxal obtained by dissolving a 30% glyoxal in acetone. In a beaker test in the manner described above a good effect was observed. The cellulose derivative particles which in this case had an average diameter of about 0.5 millimeter dropped to the bottom after a few seconds.

Example 3

Carboxymethyl cellulose having a degree of substitution of 0.55 and a viscosity in 2% aqueous solution, 20° C., of 1500 centipoises (maesured with a Brookfield viscosimeter) was subjected to the same treatment as described in Example 2. When testing the effect in the same manner it was found that the major portion of the powder which had an average diameter of 0.1 to 0.5 millimeter passed through the water surface within only a few seconds. In an identical test with untreated carboxymethyl cellulose, only a few particles left the water surface.

Example 4

Swelled starch of a commercially manufactured type (particle size about 100 microns) and useful for instance for pasting wallpaper was treated with glyoxal under the conditions described in Example 2. When the powder was distributed on the water surface in a beaker which was half-filled with water at 80° C. it was ascertained that glyoxal-treated samples were wetted considerably more rapidly than the untreated samples and that the risk of agglomeration in the dissolution was entirely eliminated by the treatment.

Example 5

Polyvinyl alcohol in finely comminuted form (particle size about 40 microns) of a commercially produced type was treated in the manner described in Example 1 with an acetone solution containing 1.5% of glyoxal (prepared by dissolving a 30% glyoxal in the acetone). When distributing the powder on a water surface it was found that the powder dropped practically immediately to the bottom while in attempts to dissolve untreated polyvinyl alcohol in the same manner a very troublesome agglomeration was encountered.

Example 6

Commercially available alginate in the form of powder (particle size about 300 microns) was treated in the manner described in Example 1 with an acetone solution containing 1.5% of glyoxal (prepared by dissolving a 30% glyoxal). In tests involving distribution of the alginate on a water surface a considerable reduction of the tendency of agglomeration was found as compared to untreated material.

Example 7

A water-soluble ethyl hydroxyethyl cellulose in powdered form and of an average particle size of 0.1 to 0.5 millimeter was treated with acetone water vapors containing glyoxal. 40 grams of air-dry ethyl hydroxyethyl cellulose was introduced into a glass cylinder rotating on a horizontal shaft and externally heated with a battery of infrared lamps. The temperature in the cylinder was 90 to 100° C. For a period of 45 minutes, there were intermittently sprayed into the cylinder by means of a spraygun 40 grams of a solution containing 0.3% of glyoxal (prepared by dissolving a 30% glyoxal). As solvents there were used acetone water mixtures in proportions varying from 100% of acetone to 100% of water. When the powder was distributed on a water surface in the manner described in Example 1 a good effect was found in all cases. The powder dropped rapidly to the bottom, while untreated cellulose ether powder remains floating on the water surface for a long period.

Example 8

Ethyl hydroxyethyl cellulose of the same type as in the previous example was placed in a circular container having a flat bottom surface which in its turn was placed on a vibrator and was heated from above with an infrared battery. After starting the vibrator, a 0.6% aqueous solution of glyoxal (obtained by dissolving a 30% glyoxal in water) was sprayed intermittently on to the powder until the cellulose ether had taken up an amount of glyoxal corresponding to 1% of its own weight. During this treatment the powder became somewhat agglomerated to smaller aggregates which, however, could easily be disintegrated after drying. When distributing the powder on a water surface in the manner described in Example 1 it was found that it left the surface practically at once.

Example 9

Ethyl hydroxyethyl cellulose of the same type as in the preceding example was treated with an acetone solution containing formaldehyde and hydrochloric acid. Hydrochloric acid was added to formalin (40%) in an amount of 4.0 milliliters per 100 grams of formalin. An acetone solution was prepared containing 5% of such formalin solution (2% of formaldehyde). 20 grams of ethyl hydroxyethyl cellulose were mixed with 30 grams of the acetone solution thus prepared and the mixture was allowed to stand for half an hour whereupon the acetone was drained off and the cellulose ether dried in an oven. In tests for determining the effect obtained as described in Example 1 it was ascertained that the powder left the water surface practically immediately.

Example 10

Ethyl hydroxyethyl cellulose in powdered form and having a degree of substitution with respect to ethoxyl of 1.3 and ethylene oxide of 0.6 was suspended in boiling water. The concentration of the cellulose ether in the suspension was 8%. A 30% aqueous solution of glyoxal was added in an amount corresponding to 0.5% of glyoxal based on the suspension. After about 10 minutes the water was quickly drained off and the wet cellulose was dried in an oven. In tests for determining the resultant effect by the method described in Example 1 it was found that the powder dropped fairly rapidly in contrast to untreated powder which remained on the surface to 100%.

Example 11

Ethyl hydroxyethyl cellulose was treated as described below with glyoxal. The ethyl hydroxyethyl cellulose was prepared by etherifying alkali cellulose obtained by mercerization of a viscose pulp with a 19% solution of sodium hydroxide in water. The cellulose derivative in question had a degree of substitution with respect to ethoxyl of 0.8 and hydroxyethyl of 0.6. The viscosity in a 2% aqueous solution measured with a Brookfield viscosimeter at 20° C. was 2100 centipoises. The cellulose derivative was in powdered form, a screen analysis showed that 80% passed through a standard screen DIN 10 (100 mesh per square centimeter), but was retained by a screen DIN 30 (900 mesh per square centimeter). The cellulose derivative was introduced into a rotating drying drum, through which heated air could be passed. In the air entering the drum, glyoxal was vaporized through spraying. The glyoxal was of a technical grade, containing 30% $(CHO)_2$, pH 0.9. The temperature in the drying drum was maintained at 80° C., the quantity of ethyl hydroxyethyl cellulose was 100 grams and the rate of air flow 75 liters per minute. The treatment was discontinued when glyoxal in an amount of 5 grams of the technical grade had been sprayed into the air current. When the powder was distributed on a water surface as described in Example 1, the powder particles practically at once passed through the water surface.

*Example 12*

A commercially available water-soluble methyl cellulose practically free from salt, which in 2% aqueous solution at 20° C. gave a viscosity, measured with a Höppler viscosimeter, of 310 centipoises, was treated with glyoxal dissolved in acetone in the manner described in Example 1. The methyl cellulose had a fibrous structure. In tests made by distributing the substance on a water surface in the manner described in the preceding examples it was found that on slight stirring the methyl cellulose was easily wetted through by water and dropped, while similar tests with untreated methyl cellulose of the same physical structure resulted in serious agglomeration.

*Example 13*

An ethyl hydroxyethyl cellulose in the form of a crude product obtained in etherification was treated with glyoxal. As the starting material for the preparation of the ethyl hydroxyethyl cellulose, a spruce sulfite pulp of dissolving-pulp type was used having an alpha cellulose content of 90% and a viscosity in cuprammonium solution of 25 centipoises measured according to the TAPPI standard method. The cellulose was mercerized with a 19% aqueous caustic alkali and was allowed to age for 5 hours, whereupon it was etherified in an autoclave with a mixture of ethylene oxide and ethyl chloride to a degree of substitution of 0.7 with respect to hydroxyethyl and 0.8 with respect to ethoxyl. Such a cellulose ether is insoluble in hot water but soluble in cold water and the crude product can accordingly be washed by means of hot water. The crude product was suspended in hot water to a concentration of 8% (based on the pure product) and was neutralized with acetic acid. To the washing water glyoxal was added in an amount of 1.5% calculated as pure $(CHO)_2$ and based on the pure ethyl hydroxyethyl cellulose. The aqueous suspension was centrifuged in a high-speed centrifuge, a refined product containing 50% solids being obtained. This was ground in a mill to a powder of granular structure and was dried for 3 hours at 60° C. in a fan-equipped oven. The average particle diameter was about 0.3 millimeter. In a test as described in Example 1 the particles passed practically at once through the water surface with no agglomeration whatever.

*Example 14*

The same ethyl hydroxyethyl cellulose as in Example 11 (i.e. a purified product) was suspended in 90° C. water to a concentration of 8%. The suspension was drained on a suction filter, whereupon a mass containing 50% solids was obtained. With continued suction, there was carefully poured onto the mass cake a hot glyoxal solution in water corresponding to 1% glyoxal (calculated as a product containing 30% $(CHO)_2$) based on the quantity of dry cellulose ether. The glyoxal was diluted with a suitable amount of water so that, as ascertained by a preliminary run, it was uniformly distributed through the cake by the suction. The cake was divided manually into smaller pieces, was dried at 70° C. for one hour and was ground. In a test as described in Example 1 the particles passed through the water surface practically instantaneously without agglomeration. It is readily understood that a similar experiment may be made in which a centrifuge is used instead of a suction filter.

*Example 15*

The same ethyl hydroxyethyl cellulose as in Example 11 was suspended in 90° C. water to a concentration of 8% and was introduced into a high-speed centrifuge whereby a mass of 50% solids content was obtained. This wet mass was compressed in an extrusion press. When the mass was fed into the extruder technical glyoxal was added drop-wise as a 30% aqueous solution of glyoxal in an amount corresponding to 0.25% of pure $(CHO)_2$ based on the dry ethyl hydroxyethyl cellulose. The compressed product was run through the extruder twice more to achieve a uniform distribution of the glyoxal. The product was ground in a mill to a powder of granular structure and was dried at 60° C. for two hours. In a test similar to that described in Example 1 the granules passed almost at once through the water surface without agglomeration.

*Example 16*

10 kilograms of the same ethyl hydroxyethyl cellulose as in Example 11 were charged into a Werner Pfleiderer type mixer. With agitation and at room temperature glyoxal was added in an amount of 0.55% (of a technical product containing 30% $(CHO)_2$) based on air-dry cellulose ether, but diluted with water to a total volume of 250 milliliters. The glyoxal was introduced at room temperature in atomized form by means of a compressed air spraying gun. Immediately after the treatment the powder was tested through distribution on a water surface as described in Example 1, and a positive, but not very strong effect was found. After storing the powder for a week at room temperature, the test was repeated and this time the particles passed substantially instantaneously through the water surface without any agglomeration. Evidently, heating of the product being treated may in certain cases be substituted by storage at room temperature for a certain period.

As shown by the above examples the treatment of this invention can be carried through in various ways. The methods of treatment can, generally spoken, be divided into two groups: Treatment with the aldehyde dissolved in a diluent and treatment with the aldehyde in vapor phase.

In the former case, the aldehyde is diluted with a liquid with which it is miscible and which under the conditions of the treatment is a non-solvent for the solid substance to be treated. The liquid, however, may be such as to cause swelling of the solid substance. It is also preferable that the solvent is volatizable so that after treatment the solid product may be dried without difficulty and without necessitating excessively high drying temperatures. Liquids which often fulfill the requirements are acetone, methyl ethyl ketone, methanol, ethanol, propanol. In some cases, water is the most inexpensive and most convenient solvent. Thus e.g. hot water may be used when treating the above-described hot-water-insoluble cellulose ethers, such as methyl cellulose and others. Water may also be employed when treating substances which are soluble in aqueous alkali only.

Vapor phase treatment may be conducted by introducing the aldehyde in vaporized form in a rotating heated drum partly filled with the substance to be treated. If desired, water vapor and acid vapors may be introduced together with the aldehyde vapors to facilitate the reaction.

A manner of treatment which might be said to be an intermediate between the above two main groups is treatment of the substance with an aerosol in which the discontinuous phase consists of droplets of the aldehyde preferably dissolved in a solvent therefor. If the liquid is sufficiently finely dispersed and the treatment is made with moderate amounts thereof, the solvent may in this case be a solvent for the solid substance to be treated.

In general, only small amounts of the aldehyde are necessary when the reaction conditions are suitably selected. Thus in certain cases, favorable results have been observed with additions as low as about 0.005% of aldehyde based on the substance treated. Generally speaking, favorable reaction conditions include an elevated temperature and, especially as regards formaldehyde, a high acidity. If for special reasons it is not possible or desirable to operate under optimum conditions of reaction, it will be necessary to employ more aldehyde to obtain the desired result or to employ a longer period of treatment. The amount of aldehyde, however, should not be so great that under the reaction conditions involved cross-linkages are formed in the substance undergoing treatment to such an extent that the solubility of the substance is materially impaired. Generally, the amount of aldehyde added will be below 5% based on the weight of the substance treated and often below 1 or 2%. Thus, the amount of aldehyde used will generally be within the range of about 0.005 to 5% and should be selected within this range so that under the reaction conditions involved it is sufficient to produce the desired result, i.e. substantially eliminate or reduce the tendency of agglomeration or lumping, but insufficient to substantially impair the solubility characteristics of the substance. The amount of aldehyde to be used in a specific case to give optimum results can easily be ascertained by simple preliminary trials. With glyoxal, a preferred range is about 0.02–0.5% based on the weight of the substance treated.

As above mentioned a high temperature is, for some methods of treatment favorable for obtaining the desired result. However, the temperature is not critical for the result of the treatment, and the method of this invention can actually be carried through at a temperature about or below room temperature (about 20° C.), in which case, however, a greater amount of aldehyde or a longer period of treatment will, as a rule, be desirable. Upwards, the temperature is limited only by the ability of the substance to be treated of withstanding high temperatures without deteriorating or decomposing to an undesirable degree. Generally, the temperature will not surpass about 250° C., a preferred temperature range is about 50 to 150° C.

Nor is the time of treatment critical for the result. When using high temperatures and a greater amount of aldehyde a time of a minute or even less may be sufficient to produce the desired result, while at lower temperatures or a smaller amount of aldehyde a longer period of treatment of the order of an hour or more may be found desirable. As seen from Example 16 it may happen that on treatment at room temperature, the improved effect becomes noticeable only after storage of the aldehyde-treated product for an extended period.

When treating with formaldehyde the reaction is, as mentioned above, favorably influenced by a high acidity, wherefore it is suitable to add an acid, such as hydrochloric or sulfuric acid. In a specific case, it may, however, e.g. in view of the danger of corrosion of equipment used, be undesirable to increase the acidity by adding acid, in which case it is more preferable to employ a greater amount of formaldehyde or continue the treatment for a longer period, commercially available glyoxal in the form of a 30% or 50% solution in water usually has a sufficiently low pH (due to presence of organic acids) not to make any special addition of acid necessary.

It will be noted that the treatment is carried out with the material in solid form and that, apart from a swelling, which may occur in some cases, no change of the physical form of the product takes place in the treatment. Nor is the chemical structure of the substance or its chemical and physical properties, such as solubility, altered to any substantial extent apart from the fact that the substance has a reduced tendency of forming aggregates whereby dissolution of the substance in water or in aqueous alkali is facilitated and accelerated particularly under conditions such that agglomeration of the untreated substance would seriously interfere with the dissolution process.

While certain representative embodiments and details have been described to illustrate the invention it will be obvious to those skilled in the art that many variations and modifications are possible without departing from the spirit and scope of the invention.

Having now particularly described the nature of my invention and the manner of the operation what I claim is:

1. A method of treating a cellulose derivative selected from the class consisting of cellulose esters and ethers soluble in water and cellulose esters and ethers soluble in aqueous alkali, which comprises reacting said cellulose derivative in solid form with an aldehyde selected from the group consisting of formaldehyde and glyoxal in an amount which is within the range of from about 0.005% to about 5% based on the weight of said cellulose derivative and which is insufficient to substantially impair the solubility of said cellulose derivative but sufficient to substantially reduce the agglomeration of said cellulose derivative when it is subsequently dissolved in said solvent.

2. A method as claimed in claim 1 in which said aldehyde is glyoxal.

3. A method as claimed in claim 2 in which the amount of glyoxal is within the range of from about 0.02% to about 0.5% based on the weight of said cellulose derivative.

4. A method as claimed in claim 1 in which said aldehyde is formaldehyde.

5. A method as claimed in claim 1 in which the amount of aldehyde is within the range of from about 0.005% to about 2% based on the weight of said cellulose derivative.

6. A method as claimed in claim 1 in which said aldehyde is dissolved in an organic solvent.

7. A method as claimed in claim 1 in which said aldehyde is present in vapor form.

8. A method as claimed in claim 1 in which said aldehyde is present in droplet form.

9. A method of improving the rate of dissolution of ethyl hydroxyethyl cellulose soluble in a solvent selected from the group consisting of water and aqueous alkali which comprises reacting said cellulose in solid particulate form with an aldehyde selected from the group consisting of formaldehyde and glyoxal in an amount about 0.005% but not exceeding 5% of the weight of said cellulose ether so as to reduce the tendency of said ether to agglomerate when subsequently contacted with said solvent.

10. A method as claimed in claim 9 in which said aldehyde is glyoxal.

11. A method as claimed in claim 1 in which said cellulose ether is ethyl hydroxyethyl cellulose.

12. A method as claimed in claim 1 in which said cellulose derivative is a cellulose ether which is soluble in cold water and insoluble in hot water and said aldehyde is dissolved in hot water.

13. A method as claimed in claim 1 in which said cellulose derivative is methyl cellulose.

14. A method as claimed in claim 1 in which said cellulose derivative is methyl hydroxyethyl cellulose.

References Cited in the file of this patent

UNITED STATES PATENTS

| | | |
|---|---|---|
| 2,148,952 | Maxwell | Feb. 28, 1939 |
| 2,285,490 | Broderick | June 9, 1942 |
| 2,399,456 | Yates et al. | Apr. 30, 1946 |
| 2,635,972 | Azorlosa et al. | Apr. 21, 1953 |
| 2,636,804 | McClellan et al. | Apr. 28, 1953 |
| 2,684,914 | Heiss | July 27, 1954 |